US012775962B2

(12) United States Patent
Uppal et al.

(10) Patent No.: US 12,775,962 B2
(45) Date of Patent: Oct. 27, 2026

(54) SYSTEM AND METHOD FOR DETERMINING USER INTEREST OVER TIME BASED ON APPLICATION DATA

(71) Applicant: GLANCE INMOBI PTE. LIMITED, Singapore (SG)

(72) Inventors: Shaurya Uppal, NewDelhi (IN); Taniya Ghosh, Junnasandra (IN)

(73) Assignee: GLANCE INMOBI PTE. LIMITED, Singapore (SG)

( * ) Notice: Subject to any disclaimer, the term of this patent is extended or adjusted under 35 U.S.C. 154(b) by 0 days.

(21) Appl. No.: 18/489,358

(22) Filed: Oct. 18, 2023

(65) Prior Publication Data

US 2025/0014075 A1 Jan. 9, 2025

(30) Foreign Application Priority Data

Jul. 5, 2023 (IN) ............................ 202341045039

(51) Int. Cl.
*G06Q 30/00* (2023.01)
*G06Q 30/0251* (2023.01)
*G05B 19/418* (2006.01)

(52) U.S. Cl.
CPC ................................ *G06Q 30/0269* (2013.01)

(58) Field of Classification Search
CPC ....................... G06Q 30/0269; G06Q 30/0631
See application file for complete search history.

(56) References Cited

U.S. PATENT DOCUMENTS

| | | | | |
|---|---|---|---|---|
| 10,762,436 B2 * | 9/2020 | Green | ................. | G06F 16/9535 |
| 11,461,634 B2 * | 10/2022 | Bhatia | ....................... | G06N 3/04 |
| 2016/0299977 A1 * | 10/2016 | Hreha | ................. | G06F 16/9537 |
| 2021/0201149 A1 * | 7/2021 | Zhong | ................. | G06F 16/2282 |

OTHER PUBLICATIONS

"Classification of Mobile Applications with rich information". IEEE. 2015. (Year: 2015).*
"Recommendations for Mobile Apps Based on the HITS Algorithm Combined With Association Rules". 2019. IEEE. (Year: 2019).*

* cited by examiner

*Primary Examiner* — Maria V Vanderhorst

(57) ABSTRACT

Disclosed is a method and system for determining user interest of at least one user based on interactions of the at least one user with the user's user device and providing recommendations to the at least one user's user device based on the determined user interest of the at least one user. The method includes identifying user embeddings, by a first embeddings identifier module. The method includes identifying user interest representation, by the user interest identification module, based on identified user embeddings for determining user interest of the at least one user. Lastly the method includes providing recommendations to the at least one user's user device, by a recommendation module, based on determined user interest of the at least one user.

16 Claims, 10 Drawing Sheets

Skip-gram

Word2Vec Skip-gram

```
model.wv.most_similar('com.eivaagames.RealChess3DFree', topn=10)
```

```
[('com.chess.strategy.boardgame', 0.8503021597862244),
 ('com.chess.champ', 0.8341854810714722),
 ('com.Alienforcegames.ChessFusionFree', 0.8238512873649597),
 ('pl.lukok.chess', 0.8166211247444153),
 ('com.hagstrom.henrik.chess', 0.8158779740333557),
 ('com.kingsofgames.chessuniverse', 0.8128247857093811),
 ('com.jetstartgames.chess', 0.8042917251586914),
 ('chess.online.mplay.free.friends', 0.8003441691398621),
 ('com.dupuz.checkers.checkmate', 0.7862133383750916),
 ('com.ansangha.drchess', 0.7830650806427002)]
```

Chess Game

```
model.wv.most_similar('com.moviestudio.videoframe', topn=10)
```

```
[('com.creator.videoeditor', 0.8012595176696777),
 ('com.pcpe.video.background', 0.7953984141349792),
 ('com.energysh.onlinecamera1', 0.7695937156677246),
 ('com.doionline.photoonphoto', 0.7626858353614807),
 ('com.photocut', 0.7599384188652039),
 ('com.oq.AnimatedText', 0.7564324140548706),
 ('com.texttophoto.addtextphoto', 0.7510190606117249),
 ('maa.greenscreen_effect.background_changer', 0.7458868026733398),
 ('cornero.videobackgroundchanger', 0.7449721693992615),
 ('com.morningshine.autocutpaste', 0.742286741733551)]
```

Video Editor

FIGURE 6B

600B

SYSTEM AND METHOD FOR DETERMINING USER INTEREST OVER TIME BASED ON APPLICATION DATA

TECHNICAL FIELD

The present disclosure generally relates to the field of personalising content based on user preferences and more particularly to a system and a method for determining user interest over time, based on applications data.

BACKGROUND

Electronic data processing devices have become ubiquitous throughout the world. Providing personalized content to the device users represents an often very valuable capability. Various entities seek to access data collected by the devices such as by sensors and applications installed on the devices. Access to and assessment of such data allows entities to assess the interests of a user and utilize the assessment to, for example, generate personalized content to which the user will be more receptive. The more accurate an assessment of the user's interests, the more receptive a user may be to the personalized content. Personalized content can include advertising, news, weather, traffic, sports, scores, stock markets, current news, etc. all of which can also lead to revenue generation, such as advertising, brand loyalty, and further refining and improving assessment of user interest additional advertisings.

However, some entities have an inherent advantage in accessing data collected by the devices and therefrom determining user interests based on collected data. For example, device manufacturers may have access to certain data that is not available to other entities. Additionally, device users often install applications (also referred to as "apps") developed by or for application sources that provide additional functionality to the user and are available from various application stores, such as Google Play and Apple's App store. In addition to providing the functionality, the applications also often collect data based on the user's interactions with the application. An application source can often collect data captured by the sourced application, and the collected data can be used to assess the user's interests. However, entities other than the respective application sources often do not have access to the collected user interaction data. Furthermore, other applications also have many restrictions. For example, only battery management applications, educational applications, mental health applications, and applications with a specific use case restrict personal data from third party access.

SUMMARY

This summary is provided to introduce a selection of concepts that are further described in the detailed description of the disclosure. This summary is not intended to identify key or essential inventive concepts of the subject matter nor is it intended to determine the scope of the disclosure.

It is preferable to have applications or tools that can be enhanced further in order to acquire an in-depth understanding of user preferences. Such enhancement can be achieved by using data associated with the applications installed on the user's device. The applications installed are analyzed along with the time of installation.

Embodiments of the present disclosure disclose a method for determining a user interest of at least one user, based on interactions between the at least one user and the user's user device and providing recommendations to the at least one user's user device based on the determined user interest of the at least one user. The method includes identifying user embeddings, by a first embeddings identifier module, for at least one user based on: a first applications data, wherein the first applications data comprises a first list of applications installed on the user device of at least one user, the first applications data being determined based on one or more first set of attributes, by an applications data determination module; selecting app embeddings, by an app embeddings selection module, for the applications installed on the user device of the at least one user, wherein the app embeddings are identified for each application of a plurality of applications installed on each user device of a plurality of user devices of a plurality of users; and, performing weighted mean pooling on the selected app embedding, by a pooling module, for each application installed on the user device of the at least one user along with weights. The weights comprise the data associated with a frequency of updating an application installed on the user device of the at least one user. The method includes identifying user interest representation, by the user interest identification module, based on identified user embeddings for determining the user interest of the at least one user. Lastly, the method includes providing recommendations to the at least one user's user device, by a recommendation module, based on determined user interest of the at least one user.

Embodiments of the present disclosure disclose a system for determining user interest of at least one user based on interactions of the at least one user with the user's user device and providing recommendations to the at least one user's user device based on the determined user interest of the at least one user. The system comprising a processor in communication with a memory, the memory comprising modules for identifying user embeddings, by a first embeddings identifier module, for the at least one user based on: a first applications data, wherein the first applications data comprise a first list of applications installed on the user device of the at least one user, the first applications data being determined based on one or more first set of attributes, by an applications data determination module; selecting app embeddings, by an app embeddings selection module, for the applications installed on the user device of the at least one user, wherein the app embeddings are identified for each application of a plurality of applications installed on each user device of a plurality of user devices of a plurality of users; and performing weighted mean pooling on the selected app embedding, by a pooling module, for each application installed on the user device of the at least one user along with weights, wherein the weights comprise the data associated with a frequency of updating an application installed on the user device of the at least one user. The memory further includes a user interest identification module for identifying user interest representation based on identified user embeddings for determining user interest of the at least one user. The memory further includes a recommendation module for providing recommendations to the at least one user's user device based on determined user interest of the at least one user, wherein providing recommendations to at least one user device comprises recommending at least one app that matches the identified user interest of the at least one user.

The summary above is illustrative only and is not intended to be in any way limiting. Further aspects, exemplary embodiments, and features will become apparent by reference to the drawings and the following detailed description.

BRIEF DESCRIPTION OF THE FIGURES

The systems and methods described herein may be better understood, and their numerous objects, features, and advantages made apparent to those skilled in the art by referencing exemplary embodiments depicted in the accompanying figures. The use of the same reference number throughout the several figures designates a like or similar element.

FIG. 6B illustrates sample results obtained for training app embeddings learned from the app-sequence.

Figure 1:
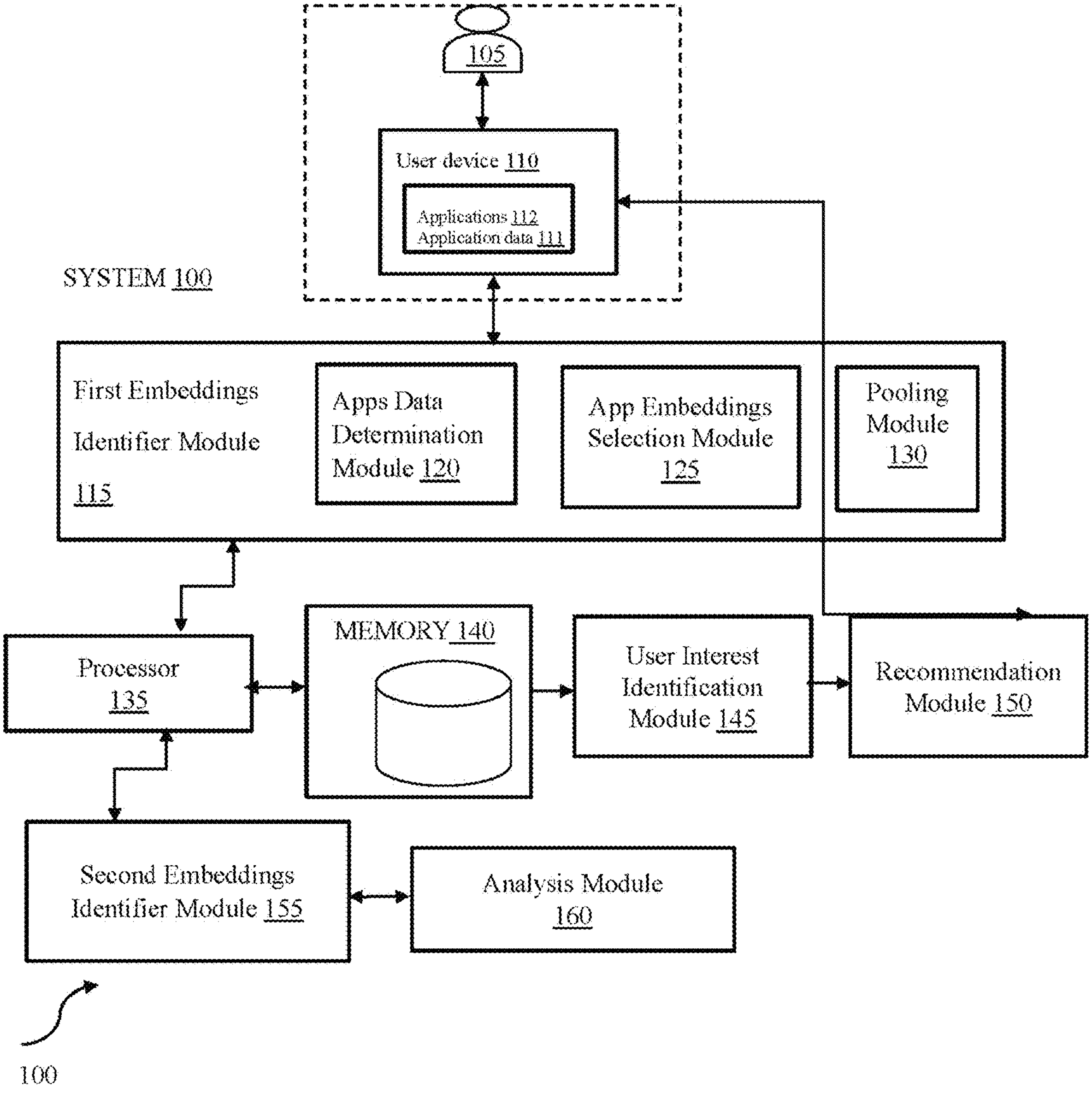
FIG. 1 is a block diagram showing an architecture of the disclosed system for determining user interest.

Further, skilled artisans will appreciate that elements in the figures are illustrated for clarity and may not have necessarily be drawn to scale. Furthermore, in terms of the construction of a system, one or more components of the system may have been represented in the figures by conventional symbols, and the figures may show only those specific details that are pertinent to understanding the embodiments of the systems and methods so as not to obscure the figures with details that will be readily apparent to those of ordinary skill in the art having the benefit of the description herein.

DETAILED DESCRIPTION

This detailed disclosure describes non-limiting embodiments of systems and methods. Other embodiments will be evident to one skilled in the art to which the disclosure relates are deemed to be a part of this disclosure.

An interest and recommendation system and method bypasses third party proprietary information that may be inaccessible or augments any available proprietary information to determine user interests. Utilizing unique technology to access data storage locations, the interest and recommendation system and method, in at least one embodiment, extract certain data from a user device and derive user interests based on a unique analysis. The system and method are configured for determining user interest over time based on captured and processed application data associated with applications installed on a user device. In at least one embodiment, the system and method apply the user interest information by activating and/or controlling internal or external technology and/or providing information to activate and/or control external technology to, for example, provide personalized solutions and/or personalising content based on derived user interests. In at least one embodiment, user interest is derived based on application data of applications installed on a user device. In addition to application data, in at least one embodiment, the system and method can derive a higher confidence in understanding a determined user's interests by including other factors, such as data presenting application installation and update times.

Furthermore, user interest can be dynamic, i.e., the interest is temporal and can change over time, and the system and method can adapt to dynamic user interests by reevaluating the user interests in view of, for example, updated information. For example, application embeddings, i.e., installations, on a user device change with deletion or installation of an application from the user device. For example, a user may be interested in filing tax returns and installs an application, such as a ClearTax™ application, but may uninstall the application after filing tax returns. Interest over time can be modeled using time-based features such as the time of day, day of the week, month, or year, as well as other contextual information. Temporal user interest represents a user's current interest also captures business pivots and adaptations such as Uber adding or moving to Uber Eats Food-tech or Food Delivery business to a transportation on-demand business. Time based user interest data enables capturing seasonal or cyclic interest of a user. The CoWin application represents another example of dynamic interest because when disease cases, such as COVID, rise, the users install it and uninstall the application when disease cases diminish.

In another example, dynamic interest of the user is based on the fact that a user's preferences may change based on their current context or situation. For example, a user who is planning a vacation may be interested in purchasing travel-related products such as flights, hotels, rental cars, etc., and installs related applications. Changing interest can be modelled using features that capture the user's current context, such as their location, situation, and other factors. Application embeddings, which represent installed applications, are dynamic, since the application embeddings change based on any application being installed or uninstalled on the user's device.

The terms "comprises," "comprising," or any other variations thereof, refer to a non-exclusive inclusion, such that a process or method that comprises a list of steps does not necessarily include only those steps but may include other steps not expressly listed or inherent to such a process or a method. Similarly, one or more devices or sub-systems or elements or structures or components preceded by "comprises," "comprising," or any other variations thereof" does not, without more constraints, preclude the existence of other devices, other sub-systems, other elements, other structures, other components, additional devices, additional sub-systems, additional elements, additional structures, or additional components.

Appearances of the phrase "in an embodiment", "in another embodiment" and similar language throughout this specification may, but do not necessarily, all refer to the same embodiment.

Unless defined otherwise, all technical and scientific terms used herein have the same meaning as commonly understood by one of ordinary skill in the art to which this disclosure belongs.

The terms 'mobile', and 'mobile device' used in the description may have the same meaning and may be used interchangeably. The terms 'apps'. 'app'. 'applications', 'mobile application' and 'application' used in the description may have the same meaning and may be used interchangeably. The words 'ads', 'Ads" and "advertisement" used in the description may have the same meaning and may be used interchangeably. In the following text, the names of various well-known applications have been used. They are all the trademark of the entities which provide those applications. For the sake of simplicity, the symbol ™ or the symbol ® have not been used in the text below.

"Embeddings" are representations of data in another form. For example, a "word embedding" is a representation of a word. Existing methods obtain app embeddings based on long short-term memory (LSTM). Existing methods define Short-term applications installed window and Long-term applications Install Window. However, LSTM methods have limited ability to capture graph structure, and are computation intensive and have limited interpretability. LSTM models typically require large amounts of training data to achieve good performance. LSTM models are designed to operate on fixed-length sequences and may struggle to adapt to changes in graph structure or edge weights over time.

Figure 2:
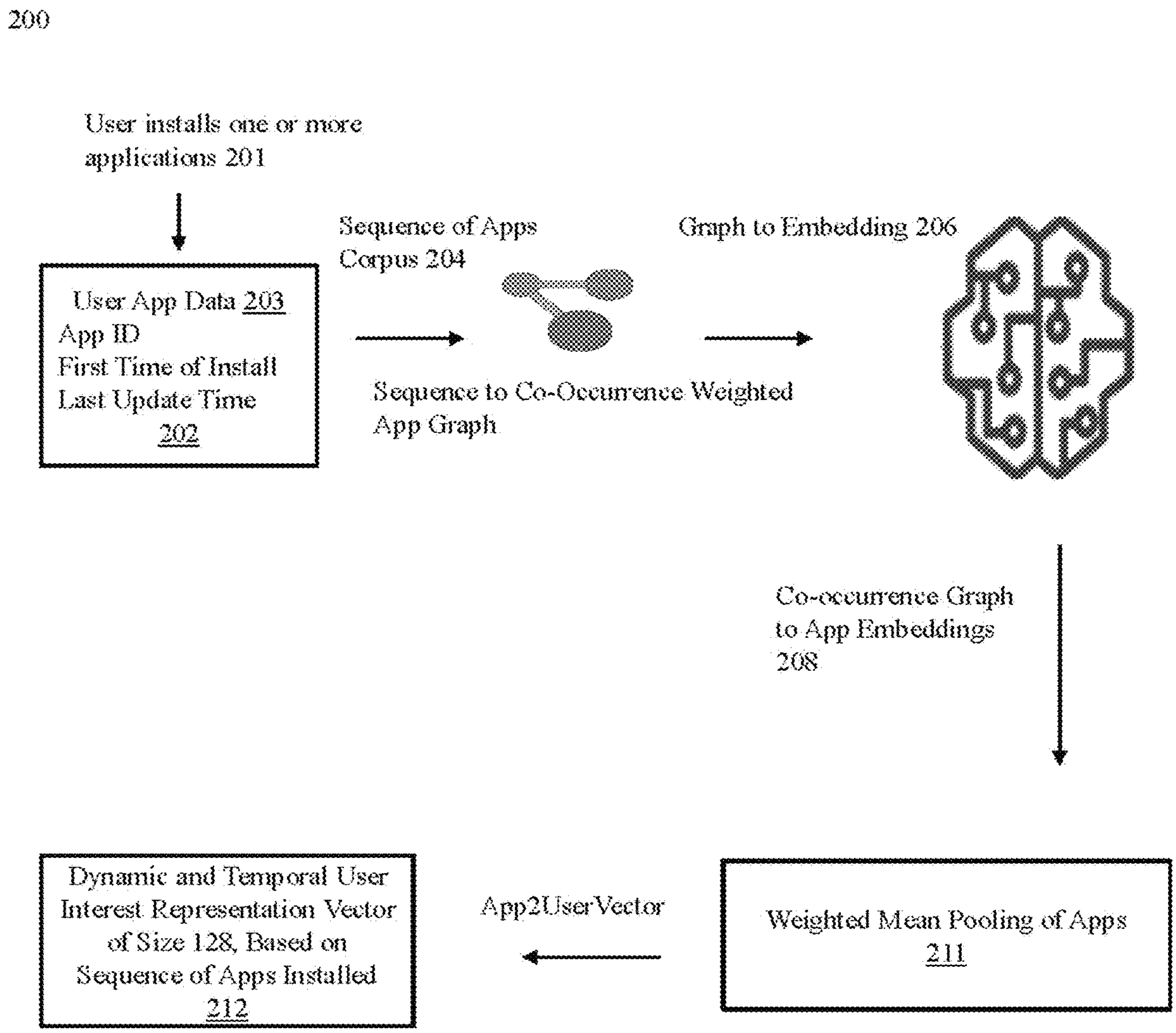
FIG. 2 is an exemplary block diagram of the method for determining user interest.

FIG. 1 is a block diagram depicting an exemplary architecture of a proprietary information bypass, user interest and recommendation system 100 for determining a user interests, such as user product and service interests, from application embeddings. FIG. 2 is an exemplary block diagram representing an interest and recommendation method 200 for determining the user interest. In at least one embodiment, the user interest and recommendation system 100 operates in accordance with the interest and recommendation method 200 to determine such user interest based on interactions between the user with the user's device and provides recommendations to the user via the user device based on the determined user interests.

The user interest and recommendation system 100 and user interest and recommendation process 200 can determine user interest and recommendations for one or more users. The system 100 and process 200 are described with respect to a single user, such as user 105, and the same process can be used to determine user interest and recommendations for multiple users.

Referring to FIGS. 1 and 2, in operation 201, the user 105 installs one or more applications on user device 110. In at least one embodiment, in operation 202 the user device 110 internally stores the application data 111 associated with the installed one or more applications 112 in publicly published memory locations, such as a particular file directory in the user device 110 memory, so that the application data 111 is generally accessible and not proprietary to the application source. Because the application data 111 is not proprietary to the application source or otherwise unavailable or unknown to third parties, in operation 202 the user device 110 can collect and transmit the application data 111 to the first embeddings identifier module 115. The application data 111 represents, for example, application identifiers (ID's) for each of the one or more applications 112, first installation date and time of each of the one or more applications 112, and a most recent update time of each of the one or more applications 112. Embodiments of the application data 111 can include other data useful for determining user interests. The process of collecting and transmitting the application data 111 to the first embeddings identifier module 115 is a matter of design choice. In at least one embodiment, the data collection for the application data 111 is carried on the user device 110 by using a software development kit (SDK) based on a scheduler. The scheduler generates a particular type of event which triggers the application data 111 collection. The SDK sends this application data 111 to the analytics layer of the disclosed system based on a predetermined frequency. This application data 111 is then processed and exposed in an ORC format to the first embeddings identifier module.

Further, the user 105 may communicate with the system 100 using one or more user devices such as user device 110. The manner of communication is a matter of design choice and includes communication networks and other communication technologies. Examples of the user device 110 include, but is not limited to, a mobile phone, a computer, a tablet, a laptop, a palmtop, a handheld device, a telecommunication device, a personal digital assistant (PDA), and the like.

Examples of communication networks include, but are not limited to, a mobile communication network, a Local Area Network (LAN), a Wireless Local Area Network (WLAN), a Wide Area Network (WAN), internet, a Small Area Network (SAN), and the like.

The sequence of installation of applications (hereinafter app installation sequence) on the user device 110 provides various information about the users' interests, which as previously discussed may change over time. Also, in operation 202, a cloud storage module (not shown and for example, may be a Google cloud) stores a user app data 203, which includes a list of applications installed on the user device 110 during the application installation sequence in addition to respective sets of first attributes associated with each application installation. The one or more first set of attributes includes data that is stored by user device 110 and is available to the cloud storage module, such as: a) a timestamp of an installation time of installation of each application identified in the user app data, and b) an ID of user device 110 and an app ID of each application list of applications.

The term 'user device ID' represents a unique identifier of each user device. A user may use multiple user devices. In at least one embodiment, the system 100 collects the app data 203 separately for each user device 110, and as described in more detail below. In at least one embodiment, if one user has two or more user devices and if both of the user devices are mapped to the same user, then the applications data 203 may not be accurate if consolidated for each of the user's 105 devices.

In one example, the user's interest is referred to as user interest over time because system 100 as disclosed is configured for capturing the changing user preferences over time. The example described herein may provide the explanation for the users changing interests over time. For example, if the user 105 installs a new app or uninstalls an existing application or the business of an existing app changes, then the user representation which is weighted mean pooled over all app embeddings also changes. The change in the user representation on a co-occurrence graph provides the perception of new user preferences.

The application installation sequence can be utilized as user behavior signal to improve the personalization of recommendations and ad targeting. Embodiments of the present disclosure disclose modules to acquire the greatest understanding of user choice based on the applications installed on their device, wherein the applications are analysed along with the time of installation. By using this sequence of app ids sorted by time of first installation of each application and the one or more times of updating of each application, the present disclosure discloses modules to identify the user's interest over time. The last update time is used in the weighted mean pooling stage where weight is defined as frequency or when an app was last updated.

The system 100 includes the first embeddings identifier module 115 configured for identifying user embeddings for the at least one user based on the first applications data, selection of app embeddings and performing weighted mean pooling on the selected app embeddings. As known in the state of art, the user embeddings may be defined as the function that maps raw user features in a higher dimensional space to dense vectors in a lower dimensional embeddings space. The learned user embeddings often capture the essential characteristics of the individual users.

In one embodiment, the first applications data comprise a first list of applications installed on the user device of the at least one user. The first applications data being determined based on one or more first set of attributes, by an applications data determination module 120.

The app embeddings selection module 125 is configured for selecting app embeddings for the applications installed on the user device of the at least one user. In one embodiment, the app embeddings are identified for each application of a plurality of applications installed on each user device of a plurality of user devices of a plurality of users. The steps for identifying app embeddings using the second embeddings identifier module 155 are described herein.

The first step includes capturing a second applications data for each application of the plurality of applications installed on the user devices of each of the plurality of users. Each application of the plurality of applications is analysed, by the analysis module 160, based on one or more second set of attributes. The second set of attributes comprises a) a timestamp of a time of installation of each application of the plurality of applications installed on the user devices of each of the plurality of users, and b) user device id of each of the plurality of users and app id of each of the installed applications installed on the plurality of user devices. The second step includes creating a second list of applications, using a sequence of app ids sorted based on the timestamp. The third step includes creating a co-occurrence graph (as shown and explained in detail in and with reference to FIG. 4) using the second list of applications for identifying app embeddings for each application of the plurality of applications installed on the user devices of each of the plurality of users. The third step includes identifying app embeddings by converting the created co-occurrence graph into the app embeddings (as shown and explained in detail in and with reference to FIG. 8).

Continuing the explanation of identifying user embeddings for the at least one user based on the first applications data, selection of app embeddings and performing weighted mean pooling on the selected app embedding, the pooling module 130 is configured for performing weighted mean pooling on the selected app embeddings, for each application installed on the user device of the at least one user.

In one embodiment, the weights comprise the data associated with a frequency of updating an application installed on the user device of the at least one user. For example, the term "frequency" refers to the number of times an app is updated since it was last installed and until current time. For example, for each user, the user embeddings are determined for the applications installed on the user's device. The mean pooling of vector representation embeddings is a process of taking the average value of a set of numbers that represent a certain object or concept. For the present disclosed system 100, this set refers to different applications on a user's device sorted on the basis of install time. In another example, the weight in weighted mean pooling may also be set to 1 which is simple mean pooling i.e., giving equal weightage to applications irrespective of last update time and frequency. Since weighting is based on frequency i.e., based on the number of times an app is updated, the disclosed system is configured to determine, the users who update an app more number of times and further provides the app's usage and importance of the applications in user's online life.

In the case of vector representation of embeddings, these numbers are values that describe different features or characteristics of the object. For the purpose of the disclosed system, the vector representation of embeddings may be, for example, an app of Ecommerce, such as Amazon, or a gaming app such as Candy Crush, or a finance app such as Zerodha, or a social media app such as LinkedIn. By taking the average of these values, a single, condensed representation of the object is created that captures its overall properties. This condensed representation can be useful in various applications.

In mean pooling, the pooling module 130 is configured to take the average of app vectors based on the applications on user's device 110 with equal weightage but this has another variation where, the last update time can be used to give extra weightage to applications which got updated recently. In mean pooling, all the app vectors are combined to a user vector where the weight is 1. It is to be noted that, while applying mean-pooling a weight is not limited to only 1 but any value, for example the minimum or the maximum value can also be set. Is such a case, the usage of pooling technique implemented depends on the downstream task (for example, personalisation, targeting, user-segmentation, etc.). Pooling, as known in the art, is a technique used to generate a fixed-size representation of a variable-length vector. Mean pooling, min. pooling, and max. pooling are common types of pooling techniques used in data science. The choice of pooling technique depends on the specific task and the characteristics of the vectors being pooled.

What follows now is for elaborating the explanation, for the sake of clarity, on weighted mean pooling by providing an example. The example below should clarify. In one embodiment, the weighted mean pooling is a mathematical operation used to combine multiple vectors into a single vector. The basic idea is to take the mean (average) of all the vectors, but to give more weight to some vectors than others. This means that some vectors are more important than others in determining the final combined vector.

Let us consider an example to illustrate this. Let us say, three vectors are assigned representing three applications: "Zomato", "WhatsApp", and "Uber". The vector for "Zomato" is [1, 2, 3], the vector for "WhatsApp" is [4, 5, 6], and the vector for "Uber" is [7, 8, 9]. To combine these vectors using weighted mean pooling, weights are assigned to each vector. For example, "Zomato" is assigned a weight of 0.2. "WhatsApp" is assigned a weight of 0.5, and "uber" is assigned a weight of 0.3. It is to be noted that this weight is coming from the update frequency. This is where timestamp of an app update is considered.

To calculate the weighted mean pooling, first each vector is multiplied by its weight, for example, as shown below:

$$[1, 2, 3]\times 0.2 = [0.2, 1.4, 1.6]$$

$$[4, 5, 6]\times 0.5 = [2.0, 2.5, 3.0]$$

$$[7, 8, 9]\times 0.3 = [2.1, 2.4, 2.7]$$

Then these weighted vectors are added.

[0.2, 0.4, 0.6]+[2.0, 2.5, 3.0]+[2.1, 2.4, 2.7]=[4.3, 5.3, 6.3]

Finally, the result shown above is divided by the total number of embeddings or the number of applications, i.e., 3 in this case, to get the final combined vector: [4.3, 5.3, 6.3]/3.0=[1.43, 1.76, 2.1] (Taking the average is, [sum÷count]).

So, the weighted mean pooling of these three vectors is [1.43, 1.76, 2.1]. This combined vector represents the "average" of the three vectors but takes into account the weights assigned to each vector.

This [1.43, 1.76, 2.1] is the user representation vector. If the weights change or one of the vectors or applications is removed or uninstalled or a new vector (i.e., new app install case) is added the final resultant embedding of the user will also change.

Just for sake of clarity, an example of Max-Pooling would have been Max ([0.2, 0.4, 0.6], [2.0, 2.5, 3.0], [2.1, 2.4, 2.7])=[2.1, 2.5, 3.0], then divide by 3. In another example, Min-Pooling would have been Min ([0.2, 0.4, 0.6], [2.0, 2.5, 3.0], [2.1, 2.4, 2.7])=[0.2, 0.4, 0.6], then divide by 3.

Once the user embeddings are identified, the next step is performed by the user interest identification module 145. The user interest identification module 145 is configured for identifying user interest representation, based on identified user embeddings for determining user interest of the at least one user. The recommendation module 150 is configured for providing recommendations to the at least one user's user device 110 based on determined user interest. In one embodiment, the recommendations to at least one user device 110 comprises recommending at least one app that matches the identified user interest of the at least one user. In addition to the above, the recommendation module 150 is configured for using the determined user interest for user segmentation and further using user segmentation for targeted advertising.

The second embeddings identifier module 155 is configured for getting trained for identifying app embeddings, for each application of the plurality of applications installed on the user devices of each of the plurality of users, for categorizing similar applications.

The second embeddings identifier module 155 is configured for getting trained for identifying app embeddings, for each application of the plurality of applications installed on the user devices of each of the plurality of users, for categorizing two applications being installed in sequence within a predetermined time period. In one example, the predetermined time period is the time period when two applications are installed together with a minimum time difference between each installation. In another example, the predetermined time period is the time when two applications are installed simultaneously. In yet another example, the predetermined time period is when the time duration between installation of two applications is below a certain threshold. For example, if A, B, and C are three different app bundle ids sorted based on time of first installation. Then there are two co-occurrence pairs <A, B> and <B, C> in the graph. Further, the directed edge may be from A→B and another edge would be from B→C. In one example, a threshold is a variable that can be tweaked. For example, two app installations' co-occurrence in a particular session can be done, and the session is kept as 30 minutes of inactivity by the user.

Referring to FIG. 2, the input data is the user applications data. In addition to capturing the user applications data in operation 203, user interest is also evaluated by weighting the time factor. For example, a more recent installation of an application can indicate a more current user interest. User device application update times can also indicate a more current user interest particularly if the applications are not automatically updated. The token sequence of applications (as shown by reference numeral 204) is sorted by the first time of installation, and the user's embedding is weighted mean pooled with exponential time decay or frequency-based method (as shown by reference numeral 211 and explained in detail below) based on the app's last update time. For example, for every user, a list of app bundle ids installed by the user with first time of installation and last app update time is captured from the input data (202). The output of the system 200 is data associated with user's varying behavioral feature based on their sequence of applications installation time.

The input data 202 is for identifying user embeddings (as shown by reference numeral 206) for the at least one user is based on the user applications data (first applications data), selection of app embeddings and performing weighted mean pooling on the selected app embeddings. The identification of user embeddings is explained in detail in FIG. 1 and not reproduced here for the sake of brevity.

Following the acquisition of the app embeddings (not shown in FIG. 2 and acquired separately), the next step includes to map (as shown by reference numeral 208) the acquired app embeddings back to the user's app installation sequence to obtain user-app embeddings. On the app embedding vectors, a weighted mean pooling 211 is implemented.

Weight is defined as an exponential time decay based on the app's last update time or frequency-based method based on number of times an app gets updated which is counted and the count is considered and the same is explained below.

It is to be noted that weighted mean pooling has two methods of using the last update time of an app.

The first method of weighted mean pooling includes a frequency-based method. In this method, the number of times an app gets updated is counted and the count is considered.

The second method of weighted mean pooling includes exponential time decay. This method considers how recently the app was updated with reference to the current date. This last-update time is only an important factor where user's auto-update is turned off on the play store and is updated manually. An app being updated frequently or recently gives a signal of that app's importance for the user.

Applications that have recently been updated are given more weight compared to the applications that have not been updated in a long time. The obtained user embeddings are used for extraction of user interest over time representation vector using the acquired app embedding and using sequence of applications installation. The user preferences captured are dynamic and temporal in nature, with each application installed or deleted, there is a change in user interest and the representation vector changes.

The paragraphs below explain the example use cases of the flow shown in the block diagram 200.

In one example, the user's representation based on applications can be used for recommendation. This helps the disclosed method to understand user preferences and recommend feed content. In another example, based on user's app reference, the disclosed method just does not personalize the content but target ads as well. The disclosed method is configured for identifying target group for an Advertiser, like to a gaming Advertiser, the disclosed method is configured to target the set of users whose user-app vector represents close to gaming interest. In yet another example, the disclosed method is configured for identifying demographics of a user, for example, the Nykaa app~high probability female; First Cry app~Parent. The disclosed method helps with better competitor brand targeting. If a user is using Gpay, the disclosed method shows ads of PhonePe.

Figure 3:
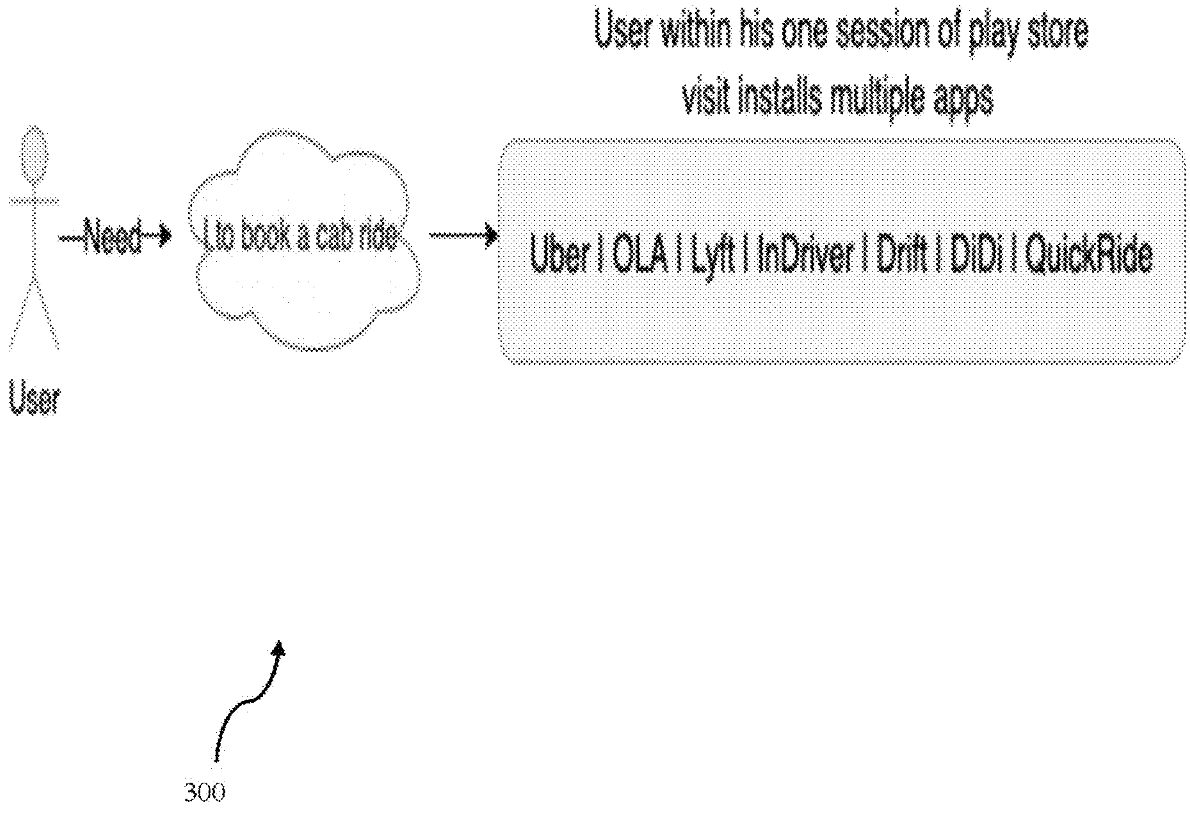
FIG. 3 illustrates the event when a user installs multiple applications.

FIG. 3 illustrates the event 300 when a user installs multiple applications. FIG. 3 shows an exemplary way of identifying a user behavioral feature based on the information associated with a user installing multiple applications within a use session. It is to be noted that the sequence shown in the FIG. 3 is for one user which is mapped into a co-occurrence weighted app graph. Such sequences in the graph are used for multiple sessions of multiple users. Typically, a user enters the play store with a specific goal and has a need. The pattern or sequence of applications installed along with the time of installation of an app reveals information about their preferences (temporal interest), which aids the system 100 in gathering information about an application category/type as well.

This sequence of applications ids ordered by time of installation are processed using Natural Language Processing technique Skip-gram with negative sampling, for example, to get a vector representation of applications. Using this app representation, the app embeddings are mapped back to the user's app sequence to get User Dynamic Interest Embedding (Representation). This representation of user embedding is referred to as Dynamic because the embedding of user will change with a deletion of an app from device or installation of an app on the device.

Figure 4:
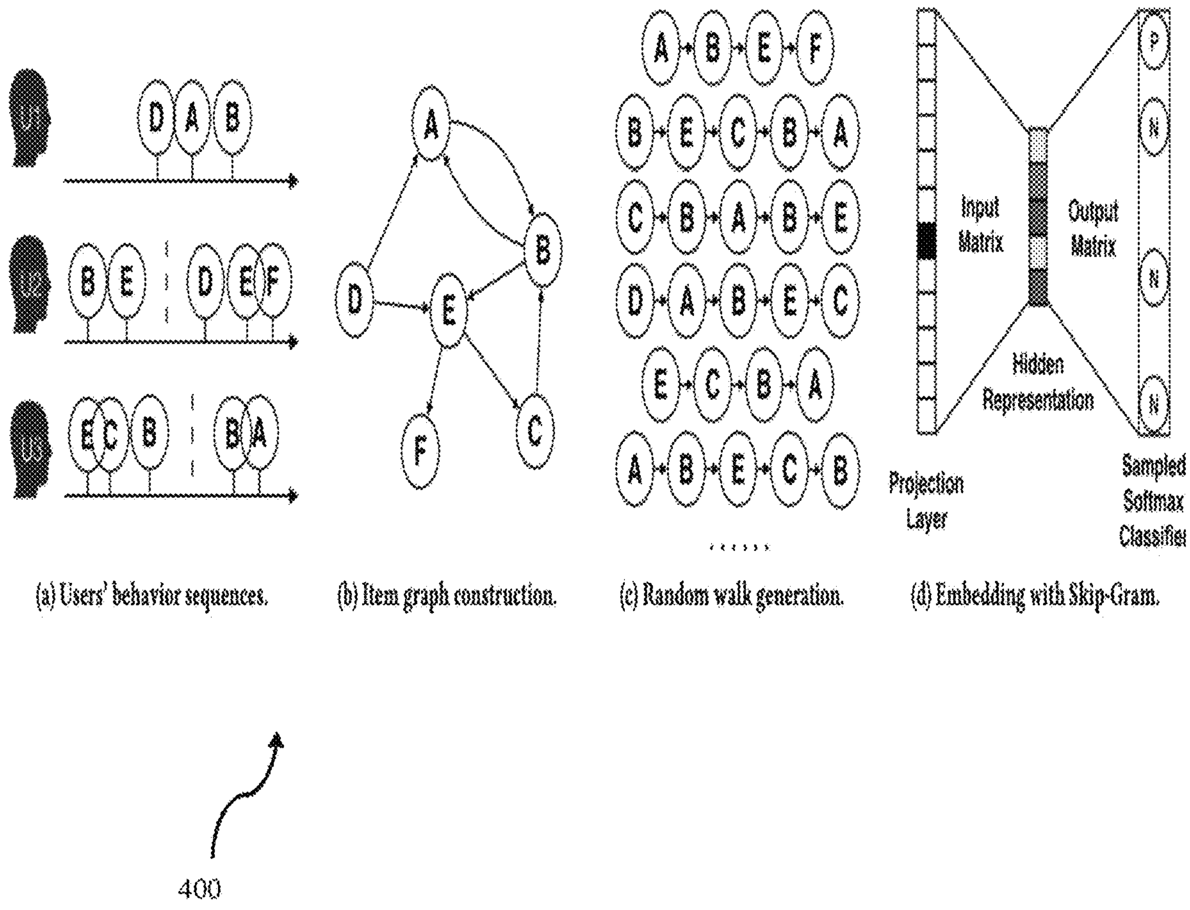
FIG. 4 illustrates a co-occurrence graph and using the created co-occurrence graph for identifying app embeddings.

FIG. 4 shows an exemplary way of creating a co-occurrence graph 400 and using the co-occurrence graph so created for identifying app embeddings, according to an embodiment of the present disclosure. The co-occurrence graph as shown in FIG. 4 comprises a plurality of nodes, a plurality of edges and a weight for each of the plurality of edges. In one example, each node represents the app id of each application installed on the user devices of each of the plurality of users. In one example, in a plurality of edges, wherein each edge represents two applications installed in sequence within a predetermined time period. The weight of the edge is the number of user devices of a plurality of users on which the two applications are installed in sequence within a predetermined time period. In one example, the edges may be directional or unidirectional. It is a directional graph of co-occurrence of applications, where the term 'direction of an edge' refers to, for a pair of applications, which app was installed first, and which app is the second co-occurrence app. For example, for two applications x and y, the direction of the edge when x is installed first, and y is installed next is the opposite of the direction when y is installed first, and x is installed next.

Figure 5:
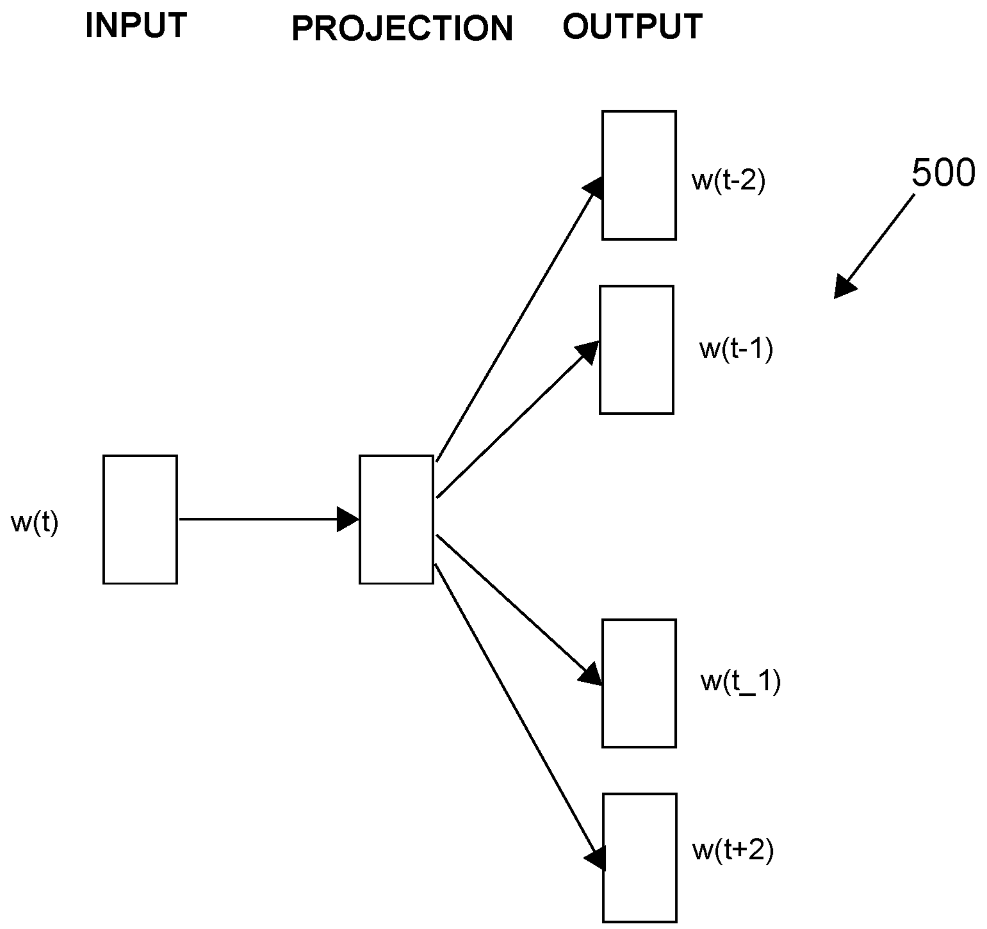
FIG. 5 illustrates Word2Vec Skip-gram technique implemented for identifying app embeddings by converting the created co-occurrence graph into the app embeddings.

FIG. 5 illustrates the Word2Vec Skip-gram technique implemented for identifying app embeddings by converting the created co-occurrence graph into the app embeddings, according to an embodiment of the present disclosure. As mentioned above, the 'app installation sequence' of a user reveals much about their dynamic interests. This user behavior signal is implemented to improve the recommendation and ad targeting systems. To obtain more detailed app information, the details with respect to the sequence of applications installed, sorted by the time of first installation is used. The Natural Language Processing technique Word2Vec: Skip-gram with Negative Sampling as shown in FIG. 5 is implemented on this sequence of applications. As known in the state of the art, the Word2vec is a method for creating word embeddings, and is used to obtain app embeddings. As known in the state of the art, the Word2vec is a method for creating word embeddings, and is used to obtain app embeddings. As known in the state of the art, an embedding is a relatively low-dimensional space into which can be translated to high-dimensional vectors. Embeddings make it easier to do machine learning on large inputs like sparse vectors representing words. In Word2vec, with word embeddings each word is assigned with a vector typically of length 100-300 dimensions.

As shown and mentioned above in FIG. 2, the input corpus refers to Sequence of Applications and tokens refers to App Id names. The embeddings are a numerical fixed dimension vector representation of a token (word). The order in which applications appear reveals much about the app category and deeper information, both of which the modules of the disclosed system are configured to extract in the form of app embeddings of size 128 by using the technique shown in FIG. 5. It is to be noted that this size of embeddings, that is to say 128, is standard for ease of storage in the system while this can easily be increased if needed. The optimal embedding size depends on various factors, such as the size of the training data, the complexity of the task, and the resources available for training the model.

Figure 6A:
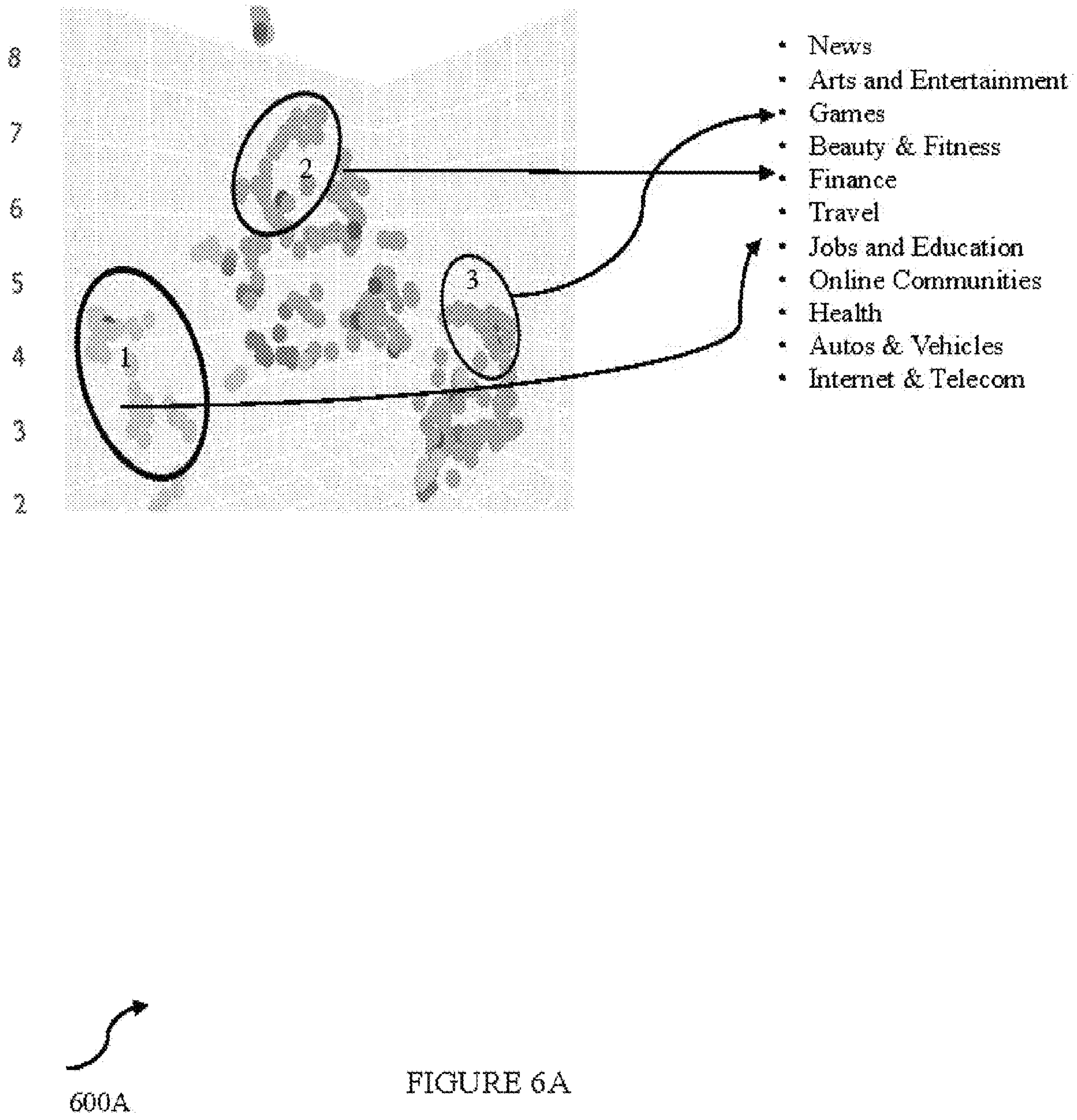
FIG. 6A illustrates 3D visualization of clustering of app embedding using the post-Uniform Manifold Approximation and Projection (UMAP) dimensionality reduction technique.

FIG. 6A illustrates exemplary illustration 600 of 3d visualization of clustering on embedding using the post-UMAP dimensionality reduction technique, according to an embodiment of the present disclosure. The app embeddings are a vector of size 128. A 128 size vector cannot be visualised in 2 dimensions or 3 dimensions. Hence, a dimensionality reduction technique known in the state of art called Uniform Manifold Approximation and Projection (UMAP) is applied to visualise them. It is evident from this visualisation concept that similar app categorise cluster together.

Following the acquisition of these app embeddings as mentioned above, the app embeddings are mapped back to the user's app install sequence to obtain user-app embeddings. On the app embedding vectors, a weighted mean pooling strategy is implemented. Weight is defined as an exponential time decay based on the app's last update time. Applications that have recently been updated are given more weight, while applications that have not been updated in a long time are given less weight. Referring to FIG. 6A, the image discloses visualization on app embeddings, similar category applications grouped together in embedding space.

To measure the relevance of these app embeddings further, clustering is applied on these embeddings. FIG. 6A depicts visualization snapshot that concludes that it is evident the trained vectors have the context of the app and form clusters within the same app category. In one example, referring to FIG. 6A, it is seen that cluster 1 illustrates job and education which are clustered together, cluster 2 illustrates finance and cluster 3 illustrates games.

Referring to FIG. 6B, a sample result snippet to see if the app embeddings learned by the app-sequence to vector method were properly trained. Based on anecdotal evidence concluded from FIG. 6B, it is clear that this approach is extremely effective. It can effectively capture similar app information.

Figure 7:
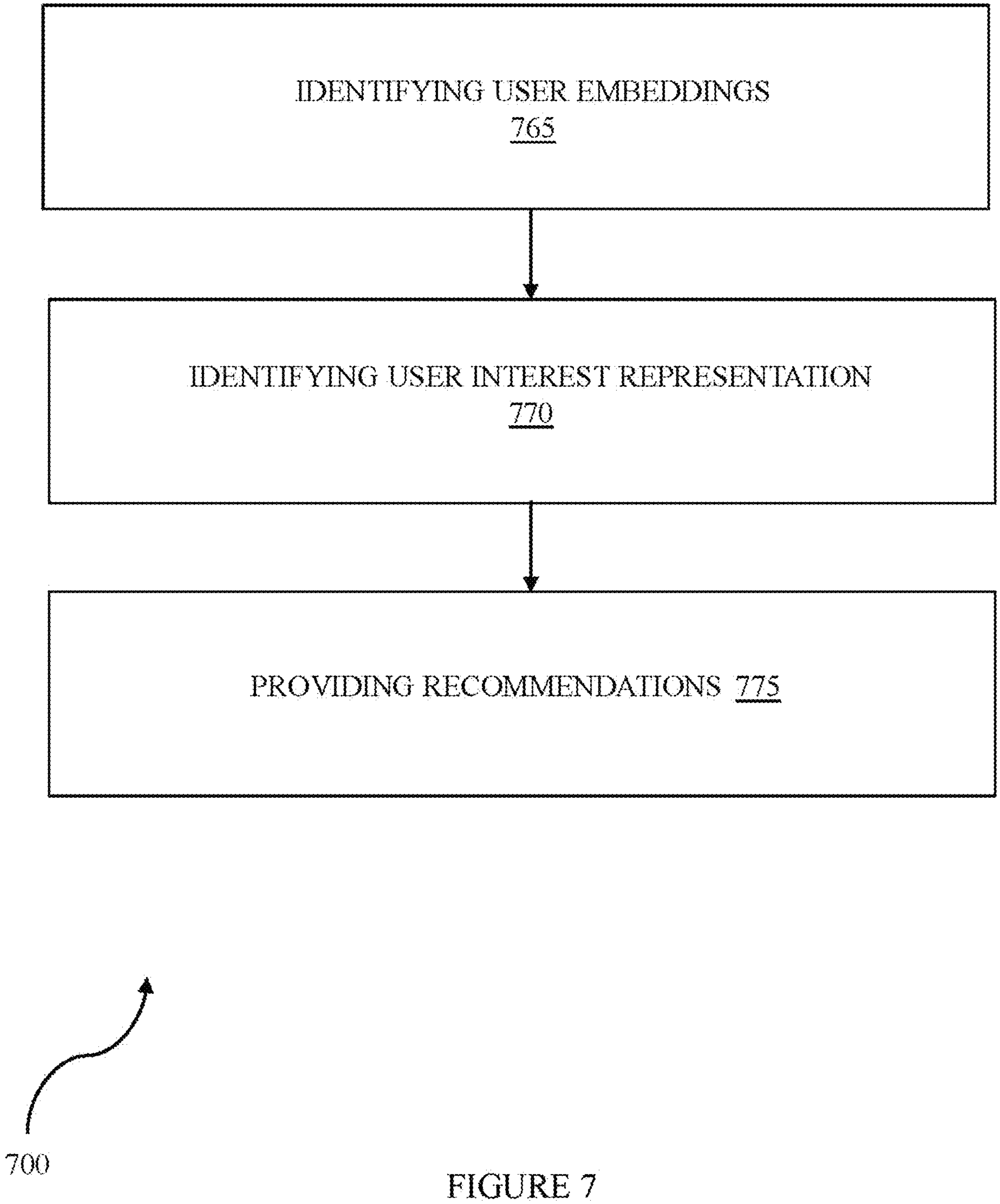
FIG. 7 is a flow chart of a method for providing recommendations to the at least one user's user device, by a recommendation module, based on determined user interest of the at least one user.

FIG. 7 is a flow chart of a method 700 for providing recommendations to the at least one user's user device, by a recommendation module, based on determined user interest of the at least one user, according to an embodiment of the present disclosure. FIG. 7 may be described from the perspective of a processor 135 that is configured for executing computer readable instructions stored in a memory 140 to carry out the functions of the modules (described in FIG. 1) of the system 100. In particular, the steps as described in FIG. 7 may be executed for providing recommendations to the at least one user's user device based on determined user interest. Each step is described in detail below.

At step 765, the user embeddings are identified, by a first embeddings identifier module, for the at least one user. The user embeddings are identified based on a first applications data, selection of app embeddings and performing weighted mean pooling on the selected app embedding.

The first applications data comprise a first list of applications installed on the user device of the at least one user. The first applications data being determined based on one or more first set of attributes, by an applications data determination module. Further, the step 765 includes a step of selecting app embeddings, by an app embeddings selection module, for the applications installed on the user device of the at least one user. The app embeddings are identified for each application of a plurality of applications installed on each user device of a plurality of user devices of a plurality of users (as described in FIG. 8). Further, weighted mean pooling is performed on the selected app embedding, by a pooling module, for each application installed on the user device of the at least one user along with weights. The weights comprise a data associated with a frequency of updating an application installed on the user device of the at least one user.

At step 770, the user interest representation is identified, by the user interest identification module, based on identified user embeddings for determining user interest of the at least one user. At step 775, recommendations are provided to the at least one user's user device, by a recommendation module, based on determined user interest of the at least one user. This step includes providing recommendations to at least one user device by recommending at least one app that matches the identified user interest of the at least one user. Further, this step also includes using determined user interest for user segmentation and further using user segmentation for targeted advertising.

Figure 8:
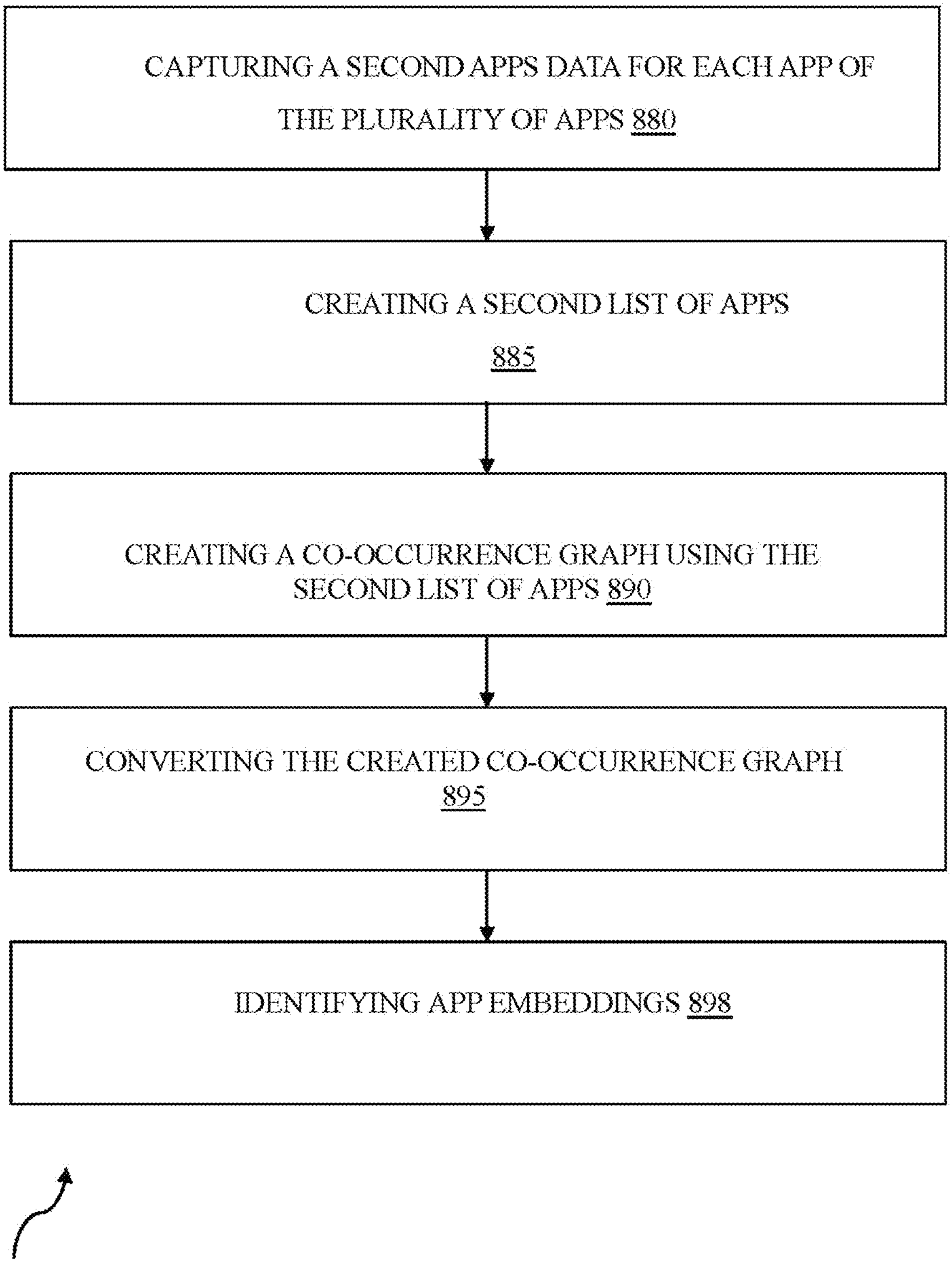
FIG. 8 is a flow chart illustrating a method for training the second embeddings identifier module for identifying app embeddings for each application of the plurality of applications installed on the user device.

FIG. 8 is a flow chart illustrating a method 800 for training the second embeddings identifier module for identifying app embeddings for each application of the plurality of applications installed on the user devices, according to an embodiment of the present disclosure. FIG. 8 may be described from the perspective of a processor 135 that is configured for executing computer readable instructions stored in a memory 140 to carry out the functions of the modules (described below and not shown in the figures) of the system 100. In particular, the steps as described in FIG. 8 may be executed for identifying app embeddings for each application of the plurality of applications installed on the user devices of each of the plurality of users. Each step is described in detail below.

At step 880, a second applications data is captured for each application of the plurality of applications installed on the user devices of each of the plurality of users. Each application of the plurality of applications is analysed, by the analysis module 160, based on one or more second set of attributes. The second set of attributes comprise: a) a timestamp of a time of installation of each application of the plurality of applications installed on the user devices of each of the plurality of users, and b) user device id of each of the plurality of users and app id of each of the installed applications installed on the plurality of user devices.

At step 885, a second list of applications is created, using a sequence of app ids sorted based on the timestamp.

At step 890, a co-occurrence graph is created using the second list of applications for identifying app embeddings for each application of the plurality of applications installed on the user devices of each of the plurality of users.

At step 898, app embeddings are identified by converting (step 895) the created co-occurrence graph into the app embeddings using random walks, skip gram technique, or DeepWalk or Node2vec or Graph Neural Network (GNN) or Structural Deep Network embedding (SDNE) or Hierarchical Representation Learning for Networks or GNN (Graph Neural Network). It is to be noted that the conversion of graph to embeddings is not limited to techniques mentioned herein but other similar techniques can also be implemented.

In one embodiment, the second embeddings identifier module is retrained based on a change in edges of the co-occurrence graph. The change in edge represents the change in two applications being installed in sequence within a predetermined time period.

The example below shows Deep Walk by creating a Graph of Application installation Co-occurrence.

For Example:

User1 Installed: Uber, Ola, Swiggy, Zomato, PayPal, Paytm, Myntra

User2 Installed: Uber, Swiggy, PayPal, Paytm, Myntra, Ola, Lyft, UberEATS

A weighted directed graph for the above sequence can be constructed based on co-occurrence count. In the above example co-occurrence count or weight edge between PayPal and Paytm has a weight of 2.

Further, the method disclosed herein includes the steps for retraining the second embeddings identifier module to capture data, if there is any change in user's app historic data or if the business of an existing app changes. The term "change in user's app historic" means that an old app is deleted from app install history or a new app is installed, or the business of an existing app is changed. Hence, retraining the app embeddings and then identifying the user embeddings aid the disclosed system to be up-to-date with refreshed model on user's preferences over time. To provide an explanation, let us consider an example. For instance, the business of Uber is changing from being purely a ride-hailing app to an app that is also a Food Delivery app. In such situations, the second embeddings identifier module may be retrained once per week, say. This interval can be set based on refresh needs and performance of the embedding. The higher the frequency of retraining of the second embeddings identifier module, the more the ability to capture changes in user's preferences early.

Embodiments of the present disclosure relate to a method to acquire the greatest understanding of user choice based on the applications installed on their device, wherein each user's applications are analysed along with the time of installation. By using this sequence of app ids sorted by time of installation and last update time, the system and method as disclosed is configured to identify the user's temporal interest. The co-occurrence graph created using the sorted sequence of app ids is used, where nodes represent app ids and edges represent the co-occurrence of two applications being installed together, weights of the edges are the number of times two applications installation co-occurred in the same sequence in the plurality of users.

To extract vector representations of these applications, from the Graphs created by co-occurrence of applications being installed together, a Node2Vec algorithm, which leverages the Skip-gram technique from Natural Language Processing with negative sampling is implemented. These app embeddings are then used to pool them to generate user embeddings, which represent the user's interests based on the sequence of applications they have installed. Since the App Update Time and Last Install Time both are captured, the disclosed method provides valuable insights into user preferences and could be useful in various applications, including personalized recommendations and targeted advertising.

In cases where a user's auto-update of applications is disabled and update happens manually, an app which gets frequently updated are more relevant. The Graph Embedding is leveraged by mapping app installation sequence to a co-occurrence graph and apply Graph Embedding Technique algorithms to get app-embeddings. Since app-embeddings are identified and are based on co-occurrence of installs the discloses system and method is configured capture similar applications as well. Example: OLA, Uber, Rapido, Quick Ride, Blu Smart, etc., are similar applications of ride-hailing domain. User Embedding means pooled over app-embedding.

Figure 9:
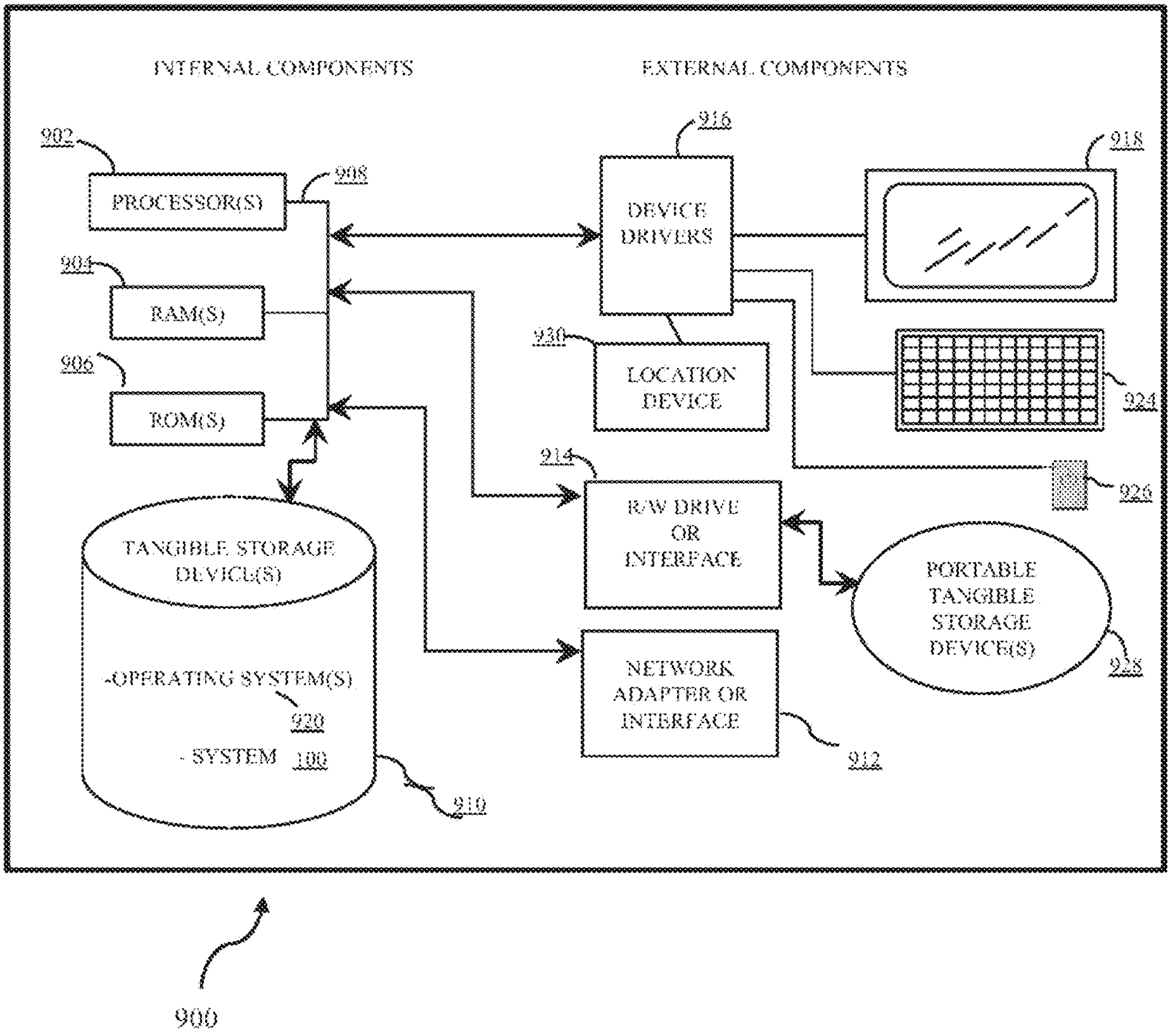
FIG. 9 is a block diagram of a computing device utilized for implementing the system of FIG. 1.

FIG. 9 is a block diagram for of a computing device 900 utilized for implementing the system 100 of FIG. 1 implemented according to an embodiment of the present disclosure. The modules of the system 100 described herein are implemented in computing devices. The computing device 900 comprises one or more processors 902, one or more computer readable memories 904 and one or more computer readable ROMs 906 interconnected by one or more buses 908.

Further, the computing device 900 includes a tangible storage device 910 that may be used to execute operating systems 920 and modules existing in the system 100. The various modules of the system 100 can be stored in tangible storage device 910. Both the operating system and the modules existing in the system 100 are executed by processor 902 via one or more RAMs 904 (which typically include cache memory).

Examples of storage devices 910 include semiconductor storage devices such as ROM 906, EPROM, EEPROM, flash memory, or any other computer readable tangible storage devices 910 that can store a computer programs and digital data. Computing device also includes R/W drive or interface 914 to read from and write to one or more portable computer-readable tangible storage devices 928 such as a CD-ROM, DVD, and memory stick or semiconductor storage device. Further, network adapters or interfaces 912 such as a TCP/IP adapter cards, wireless Wi-Fi interface cards, or 3G or 4G wireless interface cards or other wired or wireless communication links are also included in the computing device 900. In one embodiment, the modules existing in the system 100 can be downloaded from an external computer via a network (for example, the Internet, a local area network or other, wide area network) and network adapter or interface 912. Computing device 900 further includes device drivers 916 to interface with input and output devices. The input and output devices can include a computer display monitor 918, a keyboard 924, a keypad, a touch screen, a computer mouse 926, or some other suitable input device.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

We claim:

1. A method for bypassing inaccessible proprietary information and accessing application embeddings data to determine user interest of at least one user, based on interactions of the at least one user with the user's user device, and providing recommendations to the at least one user's user device based on the determined user interest of the at least one user, the method comprising:

executing code by a computer system to cause the computer system to perform operations comprising:

accessing embeddings data associated with installed application data on a user device, wherein the embeddings data represents installed applications on the user device;

identifying the user embeddings, by a first embeddings identifier module, for the at least one user based on at least:

a first apps data, wherein the first apps data comprise a first list of apps installed on the user device of the at least one user, the first apps data being determined based on one or more first set of attributes, by an apps data determination module;

selecting app embeddings, by an app embeddings selection module, for the apps installed on the user device of the at least one user, wherein the app embeddings are identified for and representative of each app of a plurality of apps installed on each user device of a plurality of user devices of a plurality of users; and representing each of the selected app embeddings as unique vectors;

performing weighted mean pooling on the selected app embedding vectors, by a pooling module, for each app installed on the user device of the at least one user along with weights, wherein the weights comprise the data associated with a frequency of updating an app installed on the user device of the at least one user;

deriving user interest representation, by the user interest identification module, based on identified user embeddings for determining user interest of the at least one user; and providing recommendations to the at least one user's user device, by a recommendation module, based on determined user interest of the at least one user.

2. The method as claimed in claim 1, wherein the one or more first set of attributes comprises:

a) a timestamp of a time of installation of each app on the first list of apps of the at least one user, and b) user device id and app id of each app on the first list of apps of the at least one user.

3. The method as claimed in claim 1, further comprising; executing the code by the computer system to cause the computer system to perform an operation further comprising:

training a second embeddings identifier module to identify app embeddings, for each app of the plurality of apps installed on the user devices of each of the plurality of users, to categorize similar apps.

4. The method as claimed in claim 3, further comprising: executing the code by the computer system to cause the computer system to perform an operation further comprising:

training the second embeddings identifier module to identify app embeddings, for each app of the plurality of apps installed on the user devices of each of the plurality of users, to categorize two apps being installed in sequence within a predetermined time period.

5. The method as claimed in claim 3, wherein training the second embeddings identifier module comprises:

capturing a second apps data for each app of the plurality of apps installed on the user devices of each of the plurality of users, wherein each app of the plurality of apps is analyzed, by analysis module, based on one or more second set of attributes comprising:

a) a timestamp of a time of installation of each app of the plurality of apps installed on the user devices of each of the plurality of users, and b) user device id of each of the plurality of users and app id of each of the installed apps installed on the plurality of user devices;

creating a second list of apps, using a sequence of app ids sorted based on the timestamp;

creating a co-occurrence graph using the second list of apps for identifying app embeddings for each app of the plurality of apps installed on the user devices of each of the plurality of users; and identifying app embeddings by converting the created co-occurrence graph into the app embeddings.

6. The method as claimed in claim 5, wherein the co-occurrence graph comprises:

a plurality of nodes, wherein each node represents an app id of each app installed on the user devices of each of the plurality of users, a plurality of edges, wherein each edge represents a two apps installed in sequence within a predetermined time period, and a weight of each of the plurality of edges, wherein the weight of the edge is the number of user devices of a plurality of users on which the two apps are installed in sequence within a predetermined time period.

7. The method as claimed in claim 6, wherein edges are directional.

8. The method as claimed in claim 3, wherein:

executing the code by the computer system to cause the computer system to perform an operation further comprising:

retraining the second embeddings identifier module based on a change in edges of the co-occurrence graph, wherein the change in edge represents the change in two apps being installed in sequence within a predetermined time period.

9. The method as claimed in claim 1, wherein the user interest of the at least one user comprises user's temporal interest and user's dynamic behavioural features.

10. The method as claimed in claim 1, wherein:

executing the code by the computer system to cause the computer system to perform an operation further comprising:

providing recommendations to at least one user device comprises recommending at least one app that matches the identified user interest of the at least one user.

11. The method as claimed in claim 1, wherein:

executing the code by the computer system to cause the computer system to perform an operation further comprising:

using determined user interest for user segmentation and further using user segmentation for targeted advertising.

12. A system for bypassing inaccessible proprietary information and accessing application embeddings data to determine user interest of at least one user based on interactions of the at least one user with the user's user device, and providing recommendations to the at least one user's user device based on the determined user interest of the at least one user, the system comprising:

one or more processors of a computer system; and a memory, coupled to the one or more processors, storing code that when executed by the one or more processors causes the computer system to perform operations comprising:

accessing embeddings data associated with installed application data on a user device, wherein the embeddings data represents installed applications on the user device;

identifying user embeddings, by a first embeddings identifier module, for the at least one user based on at least:

a first apps data, wherein the first apps data comprise a first list of apps installed on the user device of the at least one user, the first apps data being determined based on one or more first set of attributes, by an apps data determination module;

selecting app embeddings, by an app embeddings selection module, for the apps installed on the user device of the at least one user, wherein the app embeddings are identified for each app of a plurality of apps installed on each user device of a plurality of user devices of a plurality of users; and representing each of the selected app embeddings as unique vectors;

performing weighted mean pooling on the selected app embedding, by a pooling module, for each app installed on the user device of the at least one user along with weights, wherein the weights comprise the data associated with a frequency of updating an app installed on the user device of the at least one user;

deriving user interest representation, by the user interest identification module, based on identified user embeddings for determining user interest of the at least one user; and providing recommendations to the at least one user's user device, by a recommendation module, based on determined user interest of the at least one user, wherein providing recommendations to at least one user device comprises recommending at least one app that matches the identified user interest of the at least one user.

13. The system as claimed in claim 12, wherein the one or more first set of attributes comprises:

a) a timestamp of a time of installation of each app on the first list of apps of the at least one user, and b) user device id and app id of each app on the first list of apps of the at least one user.

14. The system as claimed in claim 12 wherein execution of the code by the one or more processors causes the computer system to further perform operations comprising:

training a second embeddings identifier module to identify app embeddings for each app of the plurality of apps installed on the user devices of each of the plurality of users to categorize similar apps and categorize two apps being installed in sequence within a predetermined time period.

15. The system as claimed in claim 14, wherein training the second embeddings identifier module comprises:

capturing a second apps data for each app of the plurality of apps installed on the user devices of each of the plurality of users, wherein each app of the plurality of apps is analyzed, by analysis module, based on one or more second set of attributes comprising:

a) a timestamp of a time of installation of each app of the plurality of apps installed on the user devices of each of the plurality of users, and b) user device id of each of the plurality of users and app id of each of the installed apps installed on the plurality of user devices;

creating a second list of apps, using a sequence of app ids sorted based on the timestamp;

creating a co-occurrence graph using the second list of apps for identifying app embeddings for each app of the plurality of apps installed on the user devices of each of the plurality of users; and identifying app embeddings by converting the created co-occurrence graph into the app embeddings.

16. The system as claimed in claim 15, wherein the co-occurrence graph comprises:

a plurality of nodes, wherein each node represents an app id of each app installed on the user devices of each of the plurality of users, a plurality of edges, wherein each edge represents a two apps installed in sequence within a predetermined time period, and a weight of each of the plurality of edges, wherein the weight of the edge is the number of user devices of a plurality of users on which the two apps are installed in sequence within a predetermined time period.

* * * * *